(12) United States Patent
Dayanand et al.

(10) Patent No.: US 6,639,592 B1
(45) Date of Patent: Oct. 28, 2003

(54) CURVE NETWORK MODELING

(75) Inventors: Sriram Dayanand, Toronto (CA); Richard E. Rice, Seattle, WA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 08/691,743

(22) Filed: Aug. 2, 1996

(51) Int. Cl.[7] ............................................... G06T 17/00
(52) U.S. Cl. ...................... 345/419; 345/423; 345/606
(58) Field of Search ................................ 345/433–443, 345/419, 420, 423, 427, 428, 581, 582, 585, 586, 606

(56) References Cited

U.S. PATENT DOCUMENTS 5,488,684 A * 1/1996 Gharachorloo et al.

OTHER PUBLICATIONS

Foley et al. "Computer Graphics: Principles & Practice" Chapter 11 pp 471–529, 930, 931, 1990.*
Zirbel et al. "Using AutoCap Release 13 for Windows" pp 829–831, 1190, 1191, 1995.*
Parametric Technology Corp., Pro/Designer USer's Guide, http://www.me.fauedu/computer/prohelp/proids/model: "About This Guide" at page /about.htm/#1002253 and "Overview" at page /oview.htm/#1005723; also "Customer Support" at http://www.ios.chalmers.se/data/da . . . ualer/proe/support/cs/designer.htm; all copyrighted in 1997.

James D. Foley et al., Computer Graphics Principles and Practice, Second Ed. in C, Addison–Wesley Publishing Co., Reading, MA, 1997, Ch. 8, "Input Devices, Interaction Techniques , and Interaction Tasks," pp. 347–389.

James D. Foley et al., Computer Graphics Principles and Practice, Second Edition in C, Addison–Wesley Publishing Co., Reading, MA, 1997, Chapter 9, "Dialog Design," pp. 391–433.

James D. Foley et al., Computer Graphics Principles and Practice, Second Edition in C, Addison–Wesley Publishing Co., Reading, MA, 1997, Chapter 11, "Representing Curves and Surfaces," pp. 471–531.

* cited by examiner

*Primary Examiner*—Almis R. Jankus
(74) *Attorney, Agent, or Firm*—Staas & Halsey LLP

(57) ABSTRACT

A method of modeling complex surface models using a network of intersecting non-uniform rational B-spline curves. Topological information of the curve network and interpolating surfaces to the network of curves are automatically generated. Different levels of continuity between surface patches are enforced. Surface patches of three and four sides and positional, tangent or curvature continuity between the patches are provided. Using a constrained minimization process, arbitrary, non-uniform B-spline curves may be used to manipulate the shape of the surfaces interpolating the curve network without violating the continuity conditions enforced during the generation of the surface patches allowing for very complex three-dimensional shapes to be modeled using the method.

27 Claims, 7 Drawing Sheets

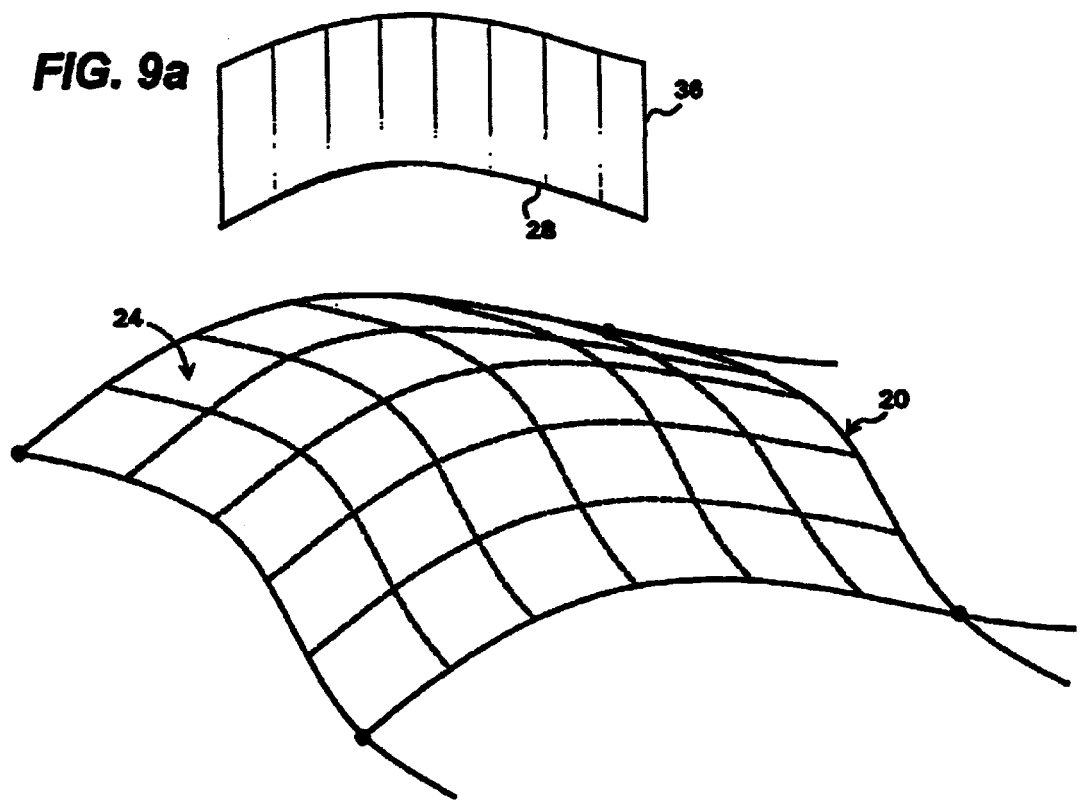

CURVE NETWORK MODELING

REFERENCE TO APPENDIX

This application includes a section of a user manual for PowerAnimator™ Version 7.5 entitled "Introduction to Curve Networks" (pages 363 to 399). The copyright owner has no objection to paper reproduction of the appendix as it appears in this patent document, or in the official files of the U.S. Patent & Trademark Office, but grants no other license and reserves all other rights whatsoever. The entire appendix is hereby incorporated by reference as if fully set forth herein.

BACKGROUND

This invention relates to curve networks for computer modeling.

Many computer applications generate or model smooth curved surfaces. Computer aided design (CAD) systems, computer animation tools, and computer graphics applications are often used to replicate inherently smooth real-world objects, or to generate novel objects. Many objects are not susceptible to exact mathematical description, and are often modeled interactively by a user employing artistic instead of scientific criteria. Computer systems require satisfactory methods of representing these objects and their surfaces. Since computers have finite storage and processing capacity, an object cannot be modeled with an infinite number of coordinate points. Instead, various methods approximate object surfaces with segments such as planes, lines, and other object "primitives" that are easier to describe mathematically.

One modeling method uses a polygon mesh, a set of connected polygonally bounded planar surfaces. Rectilinear objects, such as boxes or buildings, can be easily modeled with polygon meshes. Representing objects with curved surfaces using a polygon mesh requires approximating a curved surface by a number of smaller planar segments. Error between the approximated representation and the real object can be made arbitrarily small by using more polygons. Using larger numbers of segments requires greater computer memory storage and computation capacity.

Another modeling method uses sets of parametric bivariate (two-variable) polynomial surface patches to represent a curved object. By using inherently curved surface segments, this method enables a computer modeler to represent arbitrary curved surfaces very accurately. Typically, an object is broken down into a set of connected surface area faces, each face is modeled with a parametric polynomial surface, and the surfaces are connected together to yield the final object representation. The algorithms for employing bivariate polynomial surfaces are more complex than those for polygons, but fewer polynomial surface patches are required to approximate a curved surface to a given accuracy than with polygon meshes.

Typically, polynomial surface methods employ parametric equations based on cubic polynomial equations of a parameter (for a curve segment, one parameter is used, e.g., "t"; for a surface, two parameters are used, e.g., "u" and "v"). A number of different polynomial forms for curves and surfaces have been developed, including Hermite, Bezier, and B-spline. Whatever parameter form is chosen, one or more surfaces can be generated based upon a compact set of control points (or vertices) that unambiguously define the shape of a given curve or surface. The boundaries or edges between two polynomial surfaces can be continuous in position, tangent and curvature (0th, 1st, and 2nd derivatives). As a modeler builds up an object representation, each surface can be attached to the next, and continuity constraints across the boundary can be set to yield transitions having an arbitrary sharpness or smoothness, as desired.

SUMMARY

In general, in a first aspect, the invention features a method of computer surface modeling including the steps of storing in a computer memory a curve network of intersecting curves, and automatically determining faces from the curve network.

Implementations of the invention may include the following features. The intersections of the curves may be automatically determined, the intersections forming vertices. Curve segments between intersections of the curves may be automatically determined, the curve segments forming edges. The faces may be closed regions formed by curve segments of the intersecting curves. An interpolated curved surface for a corresponding one of the faces may be automatically calculated and stored in the computer memory. The faces may be automatically determined by a topology estimation routine. The topology estimation routine may search coupled curve segments lying between intersections of the-curves. The intersecting curves may include b-spline, non-uniform rational b-spline, or non-uniform non-rational b-spline parameterized curves. The interpolated surface may include a b-spline parameterized surface. The face may be formed from any number of coupled curve segments, or may be only three-sided or four-sided, or only four-sided. The interpolated surface may be four-sided, or the interpolated surface may be generated as four-sided and then clipped if the corresponding face is not four-sided. The curve network may be interactively generated by a user of the computer surface modeling method. Forming the curve network may include calculating and recording each intersection between all intersecting pairs of the plurality of intersecting curves as vertices, and calculating and recording each curve segment along each of the plurality of curves between successive vertices as edges.

In general, in another aspect, the invention features a method of computer surface modeling including the steps of storing in a computer memory a curve network of intersecting curves, and an interpolated surface for a face of the curve network, and modifying the interpolated surface in response to manipulation of a control curve.

Implementations of the invention may include the following features. Modifying the interpolated surface may include sampling the control curve at a sampling point, coupling the sampling point to a projection point on the interpolated surface, and controlling the shape of the interpolated surface at the projection point based upon the coupled sampling point. Controlling the shape of the interpolated surface may include performing a constrained least squares minimization calculation in which the coupled projection point is a constraint, and a control vertex of the interpolated surface is a free variable.

In general, in another aspect, the invention features, a method of computer surface modeling including the steps of storing in a computer memory a curve network of intersecting curves defining faces and edges, setting a continuity constraint at an edge of a first one of the faces, and automatically generating and storing in the computer memory an interpolated curved surface for the first face based on the set continuity constraint.

Implementations of the invention may include the following features. The continuity constraint may include positional continuity, tangential continuity, or curvature continuity. The edge may couple the first face to a second face. An interpolated curved surface for the second subject to the set continuity constraint may be automatically generated and stored in the computer memory.

In general, in another aspect, the invention features an interface method for use with a computer-based surface modeling program including the steps of enabling a user to define interactively curves forming portions of a curve network associated with a surface being modeled, and automatically, in response to the defining of curves by the user, determining faces associated with the curves.

In general, in another aspect, the invention features an interface method for use with a computer-based surface modeling program including the steps of enabling a user to manipulate interactively a curved control element shown on a display, and automatically altering a surface being modeled in response to the user's manipulations of the curved control element.

The advantages of the invention may include one or more of the following. A computer modeler does not have to construct each surface individually, stitching them together into a completed object. The modeler need only generate the overall structure of the object with curves, and the system will generate all surfaces. The modeler does not need to worry about enforcing continuity requirements across surface edges once these have been specified: as curves in the network are varied or added, the system recalculates all affected surfaces, automatically enforcing continuity. For generating finer detail, sculpt curves may be added at any location on the object. The system automatically alters the local shape of surfaces based upon the shape of the sculpt curve, and its coupling weights and region of influence assigned by the modeler. The curve network may be designed first, for "gross" control of surface shape, and sculpt curves may be added for "fine" control. A user may switch back and forth among these curves as needed. Once attached, a sculpt curve provides an extraordinarily intuitive "handle" for adjusting the local shape of surface, and any number of sculpt curves may be added to generate appropriate fine details. Further, the system automatically continues to enforce surface continuity requirements even while adjusting local surfaces towards sculpt curves, relieving the modeler of tedious, difficult details.

Other features and advantages of the invention will become apparent from the following description and from the claims.

DESCRIPTION

FIGS. 9a and 9b are perspective views of a surface and sculpt curve with a displayed weighting function.

Figure 1:
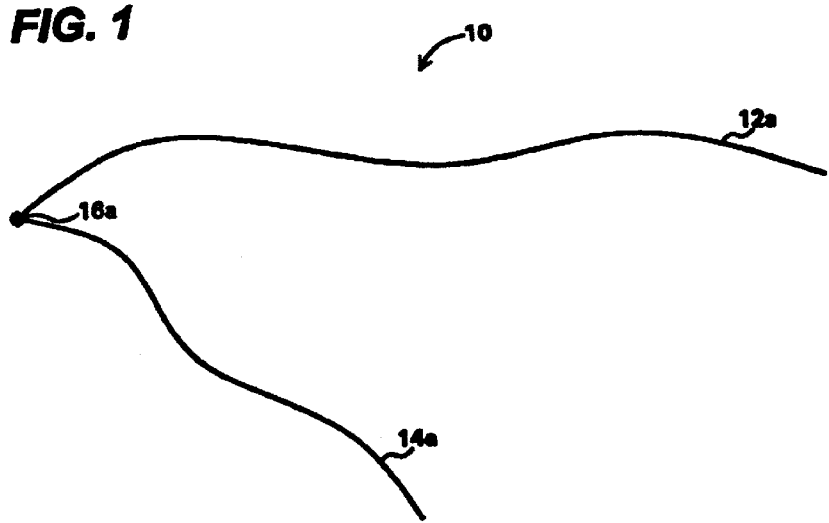
FIG. 1 is a perspective view of a curve network of two curves.
Figure 2:
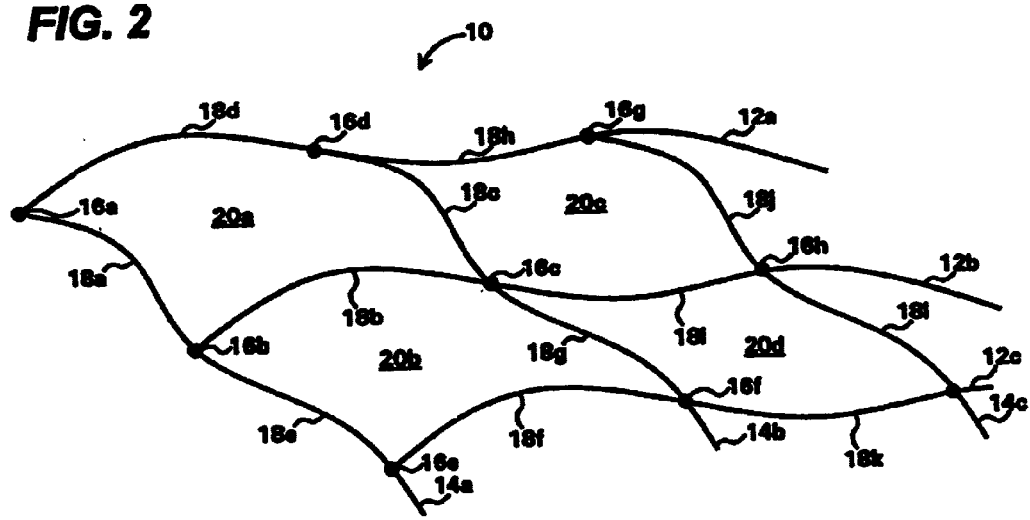
FIG. 2 is a perspective view of the curve network including enclosed faces.

Referring to FIGS. 1 and 2, a curve network 10 is constructed from curves 12 and 14, which intersect at points labeled vertices 16. For example, in FIG. 1, a roughly horizontal curve 12a and a roughly vertical curve 14a intersect at a vertex 16a. In FIG. 2, more curves have been added to generate the framework of an object's surfaces. For simplicity, all 'horizontal' curves are labeled 12a, 12b, etc., all 'vertical' curves are labeled 14a, 14b, etc., and all vertices are labeled 16a, 16b, etc. The curves may be non-uniform rational b-spline curves (NURBS), which easily allow for a range of continuity constraints at join points, and which are invariant under rotation, scaling, translation, and perspective transformations of their control points. However, other forms of curves and surfaces can also be employed, such as Hermite, Bézier, uniform b-splines, non-rational b-splines, and other spline forms such as Catmull-Rom (or Overhauser splines), uniformly shaped b-splines, and Kochanek-Bartels splines.

Each portion of a curve that extends between two neighboring vertices 16 is defined as an edge 18. For example, between vertices 16a and 16b lies edge 18a, a portion of curve 14a. Similarly, between vertices 16a and 16c lies edge 18d, a portion of curve 12a. The local group of coupled edges that forms a closed region is defined as a face 20. For example, face 20a is formed from edges 18a, 18b, 18c, and 18d, coupled by vertices 16a, 16b, 16c, and 16d. In FIG. 2, four faces 20a, 20b, 20c, and 20d are shown, created by the intersections of curves 14a, 14b, and 14c with curves 12a, 12b, and 12c.

Figure 3:
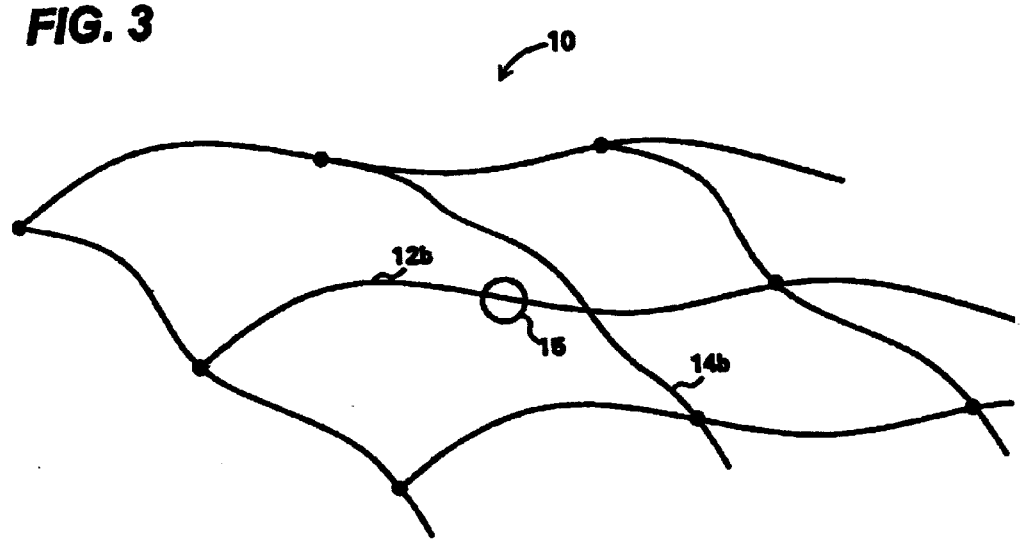
FIG. 3 is a perspective view of the curve network including a failed intersection.

For modeling ease, when curves (ordinarily modeled in simulated three dimensional space) intersect, a visual indication can be given, shown in the figures as a small dot. Intersections can be defined as the point of closest distance between two curves that falls within a selected intersection. threshold distance. That is, curves do not necessarily need to be created as 'exactly' touching to form an intersection. When the distance of closest approach falls outside the selected threshold, the visual indicator will be absent, signaling the user that one or more curves should be altered to generate an intersection. For example, in FIG. 3, curve 14b has been altered and moved away from curve 12b, and no visual symbol is shown in circle 15 where intersection 16c used to be (in FIG. 2). One should imagine curve 14b having been lifted up from the previous point of intersection: 3-dimensional relationships are difficult to illustrate on 2-dimensional drawings. (The interactive user environment can show multiple perspective views of a curve network during building, to better indicate the positions of curves in 3-dimensional space).

Any sort of intersection symbol can be used to indicate to the modeler that a vertex has been formed, such as x's, or small shaded spheres. Further, the interactive system can display additional information coupled to edges. For example, a mouse click on an edge can display a list of information about the edge: whether the attached curve is pinned or not (explained further below), the sorts of continuity constraints along its edges, and the curve type (whether a network curve or a iso-parameter or surface curve used to display generated surfaces).

The modeler can specify continuity constraints at edges that border two (or more) faces. The modeler can select the faces to have: (a) positional continuity, where they meet at their common edge; (b) tangent continuity, where the surfaces of the two faces meet and have matching tangent planes along their common edge; or (c) curvature continuity, where the surfaces meet, have matching tangent planes and have matching curvature along their common edge. Continuity constraints can be specified globally across an entire curve network or separately at each common edge. A higher degree of continuity can be specified in regions of the network where more smoothness is required, and a lower degree in regions where smoothness is not as important. Tangent and curvature continuity at an edge require that the adjoining surfaces be defined by curves (intersecting the common edge) having at least curvature (G2) continuity.

The modeler can also specify an implied tangency constraint at the boundary of a curve network, so that the continuity constraints at the boundary edge are set appropriately for a mirroring of surfaces across a plane of symmetry in the model, ensuring that tangent plane continuity is maintained between the original and mirrored surfaces.

Once faces are generated from closed connected edges, polynomial surfaces are fitted to interpolate between the four boundary curves of each face. The surface are standard bivariate NURBS surfaces. A bivariate NURBS patch is represented as a function of two variables (u and v) (compare to a curve that is a function of a single parameter (e.g., t). Whereas a curve C(t) is represented as a mapping from a straight line (of parameter t varying from, e.g., 0 to 1) to a 3-dimensional curve, a surface S(u,v) is a mapping of a rectangular domain (defined by orthogonal coordinates u and v varying between limits, e.g., 0 to 1) to a 3-dimensional surface.

For example, for cubic boundary curves, the resulting surface is a bicubic surface—cubic in both directions u and v. In general, a NURBS surface is considered to be of degree [m,n], denoting its degree in the u and v directions. A cubic NURBS surface is of degree [3,3].

A simple Coone-type patch is generated to fit the four boundary curves. Depending on the level of continuity required across adjacent surfaces, these surfaces are blended together. This involves the computation of first and second derivatives needed to ensure G1 or G2 continuity between patches. Continuity at corners (vertices), which involves mixed partial derivatives in the two parametric directions, is enforced by estimating those values from the constituent curves of the surfaces. A variety of estimation methods can be used for these mixed partial derivatives. A preferred method measures and minimizes curvature variation across an entire surface.

Figure 4:
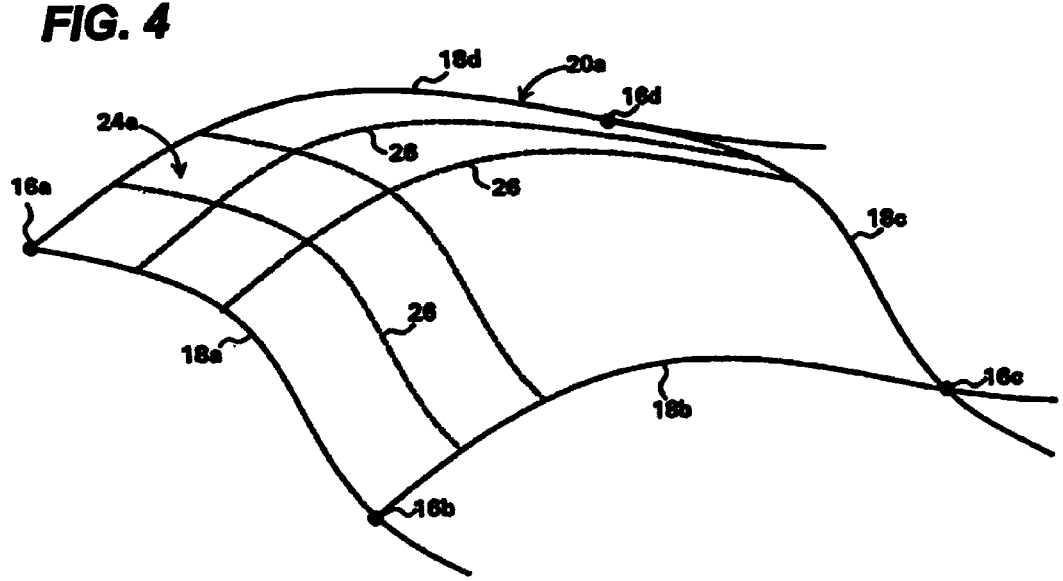
FIG. 4 is a perspective view of interpolated surface curves placed within an enclosed face.
Figure 5:
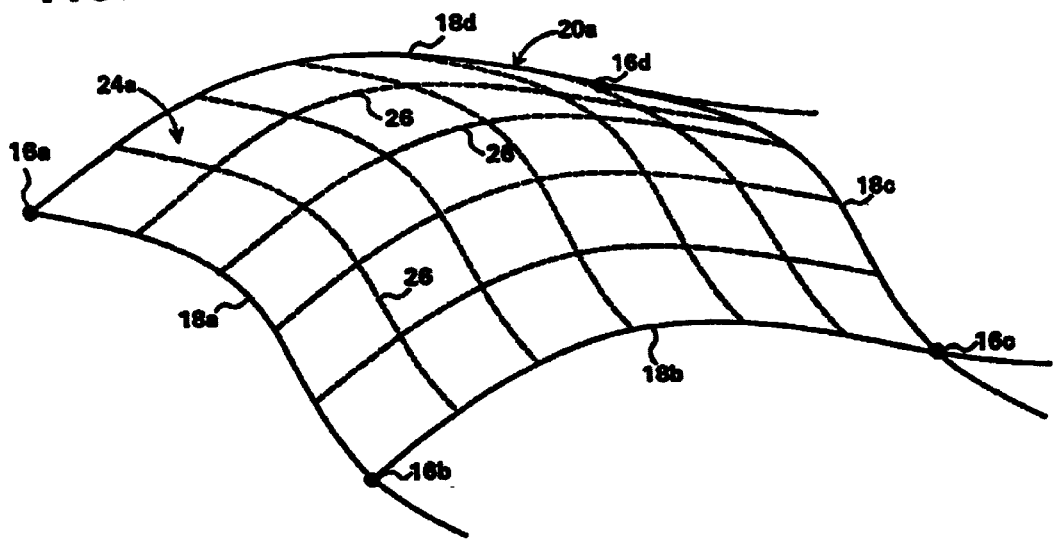
FIG. 5 is a perspective view of a full set of interpolated surface curves placed within the enclosed face.

Generated and fitted surfaces can be represented and displayed either as iterative evaluation of their polynomials or by subdivision. Referring to FIG. 4, face 20a formed by close connected edges 18a through 18d is fitted with a surface 24a partially displayed as a set of iterative parametric NURBS surface curves 26 (shown as dotted curves) (also called iso-parameter curves or iso-parms, in that one parameter is held constant while the other is varied to generate these curves). FIG. 5 shows face 20a having surface 24a fully covered with iso-parm surface curves 26. Each surface fitted to the faces of the model can be represented in computer memory by a relatively small set of control points (or control vertices).

After each surface has been generated, control points can be adjusted to enforce continuity criteria across edges. Typically, all faces are four-sided to allow ready bivariate parameterization of their surfaces. Three sided faces also can be handled: a four-sided surface is fitted to the region defined by the face, and then clipped to remove from display all non-face areas. For computational ease, all higher polygonal areas can be created from three-and four-sided regions. Also, t-junctions can be handled. T-junctions occur where one curve butts against, but does not cross another curve. Regions with t-junctions can be collapsed into smaller three- or four-sided regions fitted with surfaces. The user interface can display existing t-junction with an adjacent "T" or the like.

Figure 6:
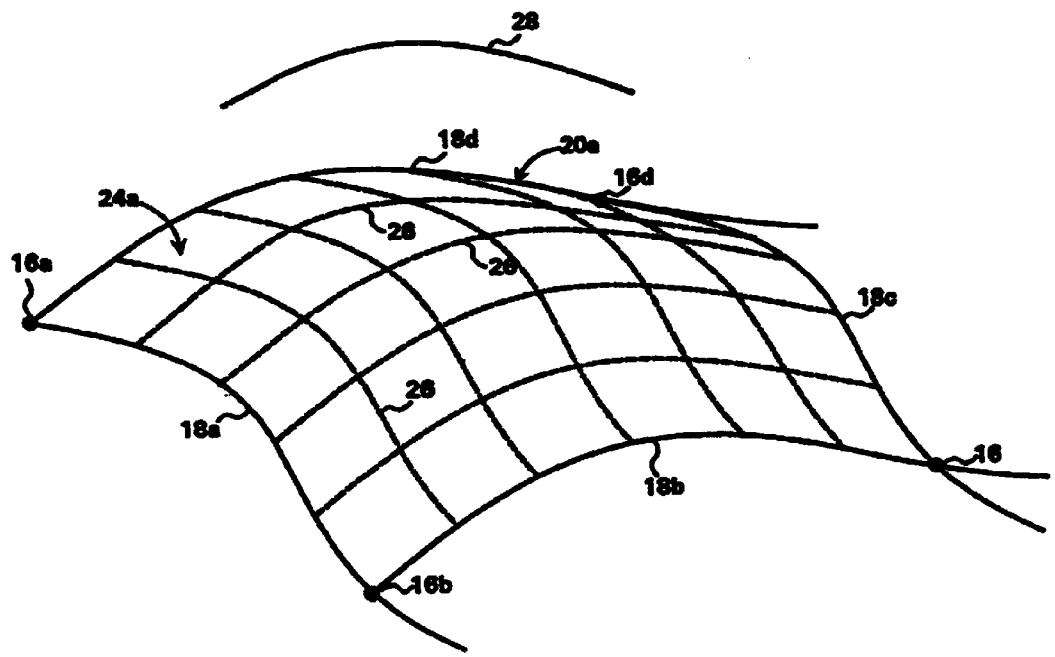
FIG. 6 is a perspective view of a sculpt curve above the face having surface curves.
Figure 7:
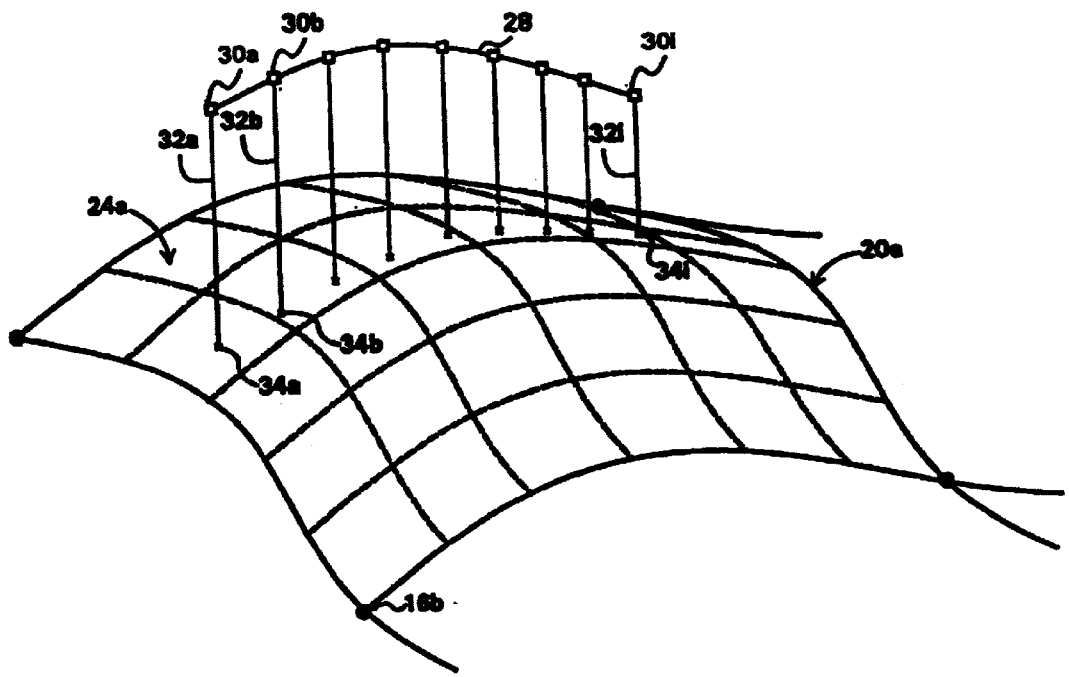
FIG. 7 is a perspective view of normal lines drawn from sampled points along the sculpt curve to the surface of the face.
Figure 8:
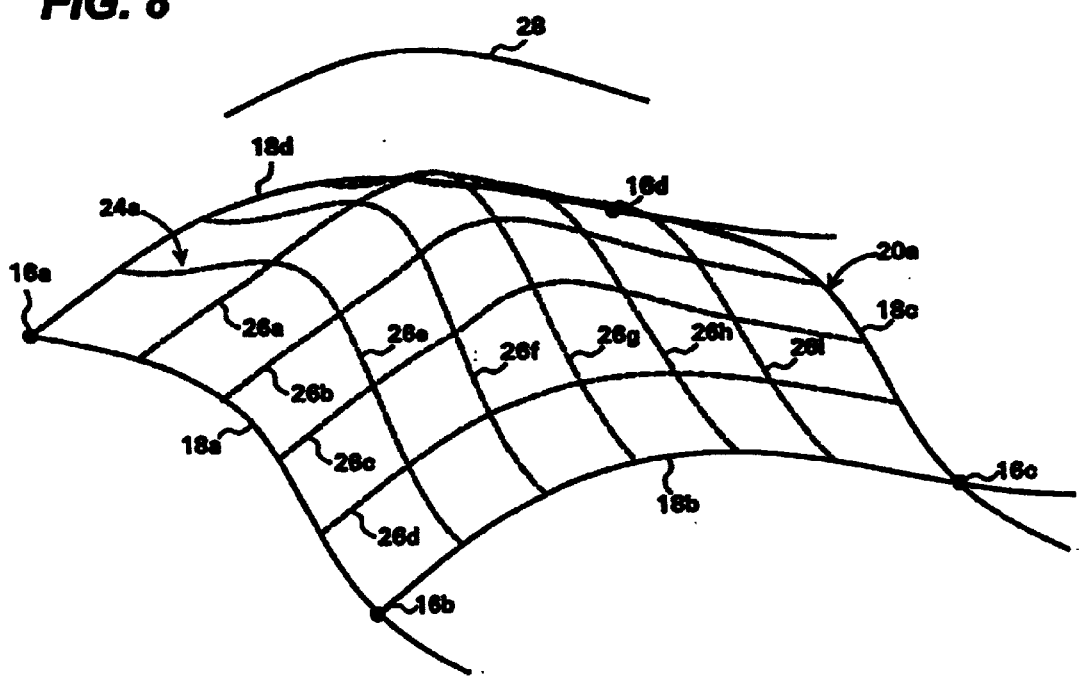
FIG. 8 is a perspective view of a deformed surface of the face due to the sculpt curve.

Referring to FIGS. 6 through 8, sculpt curves provide additional control over surface shape. A sculpt curve 28 can be any curve (typically NURBS) placed near a particular model surface 24 fitted to a model face 20. Sculpt curve 28 can be above, below or adjacent surface 24. The shape of sculpt curve 28 will affect the shape of the nearby model surface(s). Once a sculpt curve 24 has been created, it is sampled along its length at sampling points 30 (e.g., 30a through 30i, for simplicity, not all points are labeled). Normals to surface 24a connect each sampling point 30 to a corresponding projection point 34 on surface 24. Each sampling point 30 then is tied to its corresponding projection point 34 (e.g., 30a to 34a, etc.) at the parameters [u,v] for that point of the surface. The result is a one-to-one mapping of sampling points 30 along sculpt curve 28 to projection points 34 on surface 24.

Figure 9B:
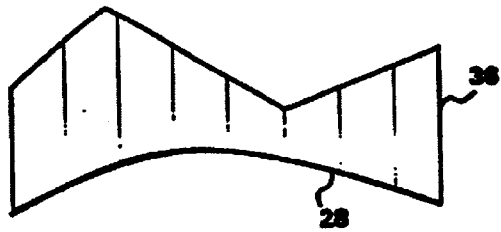

In addition to shape, sculpt curves 28 have two control parameters. First, each sculpt curve has an amount of influence, or sculpt weight. The sculpt weight controls the strength or magnitude of the binding between the sampling points 30 on the sculpt curve and the projection points 34 on surface 24. As the sculpt weight increases, the surfaces tend to approach the sculpt curve more closely, a lower weight tends to have a lighter effect on the shape of the coupled surface(s). Sculpt weight can be set as a unit weight, continuous across the sculpt curve, or as a multi-weight, having different values across the curve as a weighting profile. Multi-weight profiles can be generated as a linear interpolation of weights between a set of discrete weights at various sculpt curve positions. The interactive user environment can represent weighting profile graphically as attached along the extent of sculpt curve 28, and provide a graphical ability to adjust weights up and down along its length, as shown in FIGS. 9a and 9b.

The second parameter is the sculpt curve's region of influence, which can be set, for example, at Large, Medium and Small. Large can be the default, where all portions of the surface that have a portion of the sculpt curve mapped onto them are affected. Medium and Small shrink the default setting, limiting the influence of mapped sculpt curve points. The region of influence operates in the [u,v] parameter space of the surfaces. The extent of the effect of changing the region of influence of a sculpt curve typically depends upon the presence of adequate numbers of surface knots to enable localizing or expanding the region of influence.

Figure 10:
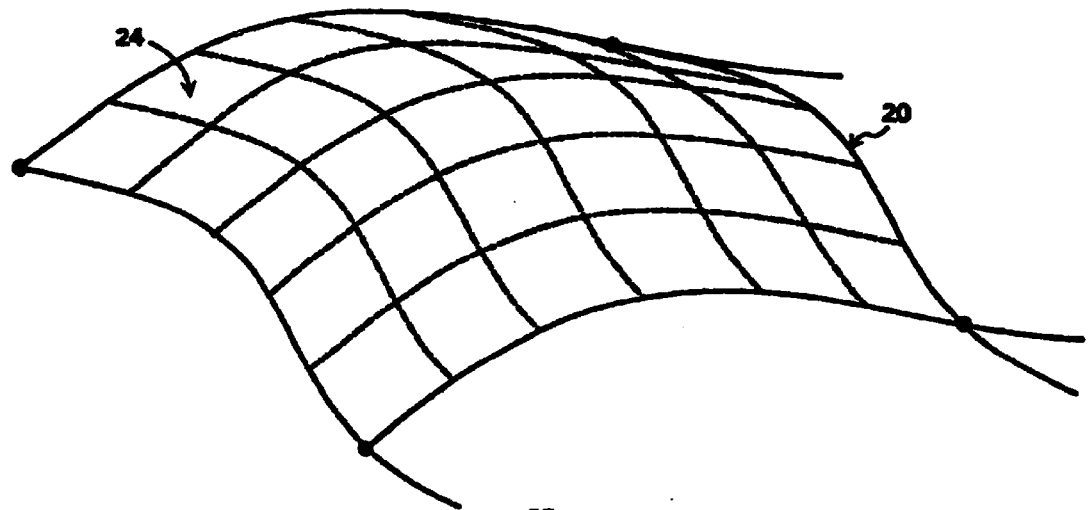
FIG. 10 is a perspective view of a surface and sculpt curve with displayed edge pinning.
Figure 10:
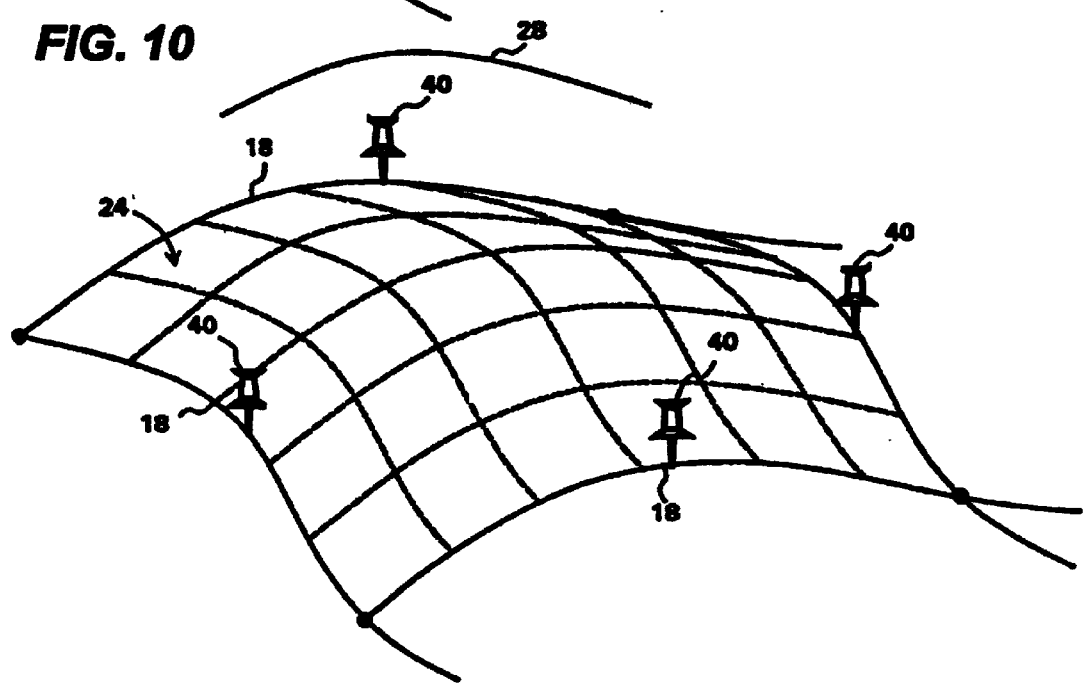

Referring to FIG. 8, applying the example sculpt curve 28 to surface 24a raises those portions of surface 24a towards sculpt curve 28, the maximum excursions occurring along surface curves 26a, 26b and 26f, 26g, and 26h, which are urged towards sculpt curve 28, and adopt its general shape. Once a sculpt curve 28 has been placed, and its effect on the underlying surface 24 generated, it can act as an interactive handle for further surface manipulation. A modeler can modify the shape, weight and region of influence of sculpt curve 28, and immediately see its effect upon its coupled surface(s). In addition, sculpt curves can be drawn across edge boundaries, and can affect the shape of more than one surface. Also, edges 18 that define faces and surfaces can be "pinned" during sculpting operations, so that while the surfaces may deform, their outer boundaries can be made to stay fixed in space. For visual ease, a "pin" icon 40 can be displayed attached to each edge in the curve network that has been pinned, as shown in FIG. 10.

Figure 11:
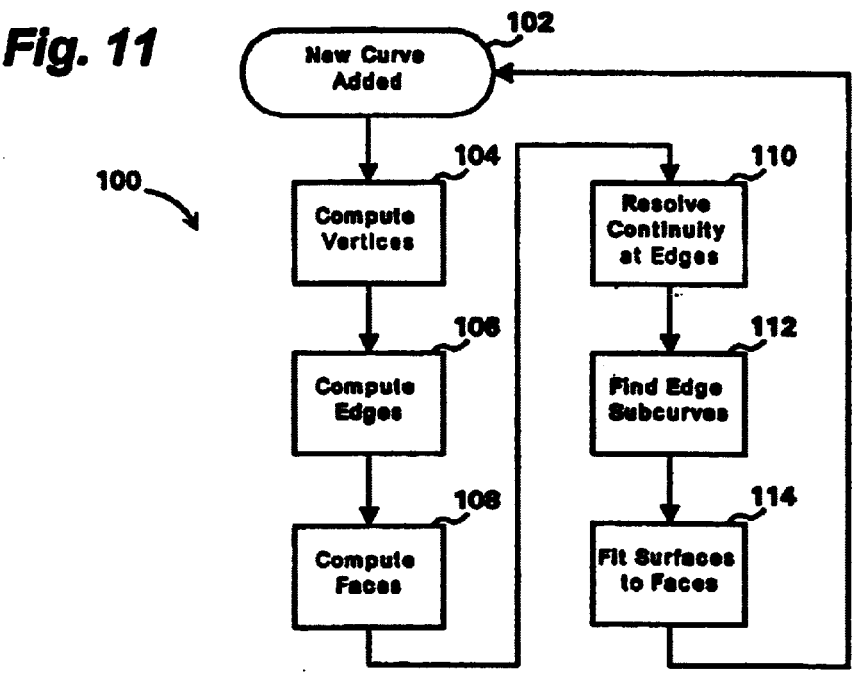
FIG. 11 is a flow chart of a method for generating surfaces from the curve network.

Referring to flowchart 100 of FIG. 11, each time a new network curve is added to the network (step 102), first all vertices where that curve intersects any other network curve are computed (step 104). Having stored a set of all intersection vertices, all edges that lie between pairs of vertices are computed and stored (step 106). From stored vertex and edge information, each face making up the object formed by the curve network is computed by a topology estimation routine, and stored, defined by its bounding edges and vertices (step 108). Next, the continuity constraints are resolved for each edge that bounds two faces (or for which mirror tangency has been selected in anticipation of a "future" mirrored coupled face) (step 110). As noted, these constraints can be global for all edges, or selected specifically for each edge. Then, each edge is defined mathematically as a subcurve of the network curve of which it is part (step 112). Once all this information has been calculated and stored, each face is defined typically by its four parameterized edge curves, attached at four vertices and having continuity requirements to enforce across an edge from one face to the next. From this information, parameterized surfaces are calculated to fit to each face (step 114). As new curves are added to the network, these steps (102 through 114) are repeated.

The faces are determined by a topology estimation routine operated by the computer system that takes the collection of vertices and edges of the curve network, determined by examining all intersections of curves with one another, as noted. The estimation routine then uses a recursive edge tracking scheme to find all closed regions in the curve network. The recursive mechanism searches all branches, and has a back tracking process that retreats when "dead-ends" are reached.

The topology information (the location and features of each face) is recomputed every time a curve is added or deleted from the network, or moved or modified in any way. The topology estimation routine performs these calculations since any of these changes can cause vertices to be created, deleted, or altered, modifying the collection of edges which in turn modifies the faces of the curve network.

The topology information is stored in computer memory as a collection of faces in the network with the faces consisting of a closed loop of edges. Each edge in turn is determined by the vertices at its ends. In addition, each edge has information about the faces (if any) that exist on either side of it. The collections of vertices, edges, and faces, along with the relationship that exist among them, provides an unambiguous and complete representation of the topology of the curve network.

Figure 12:
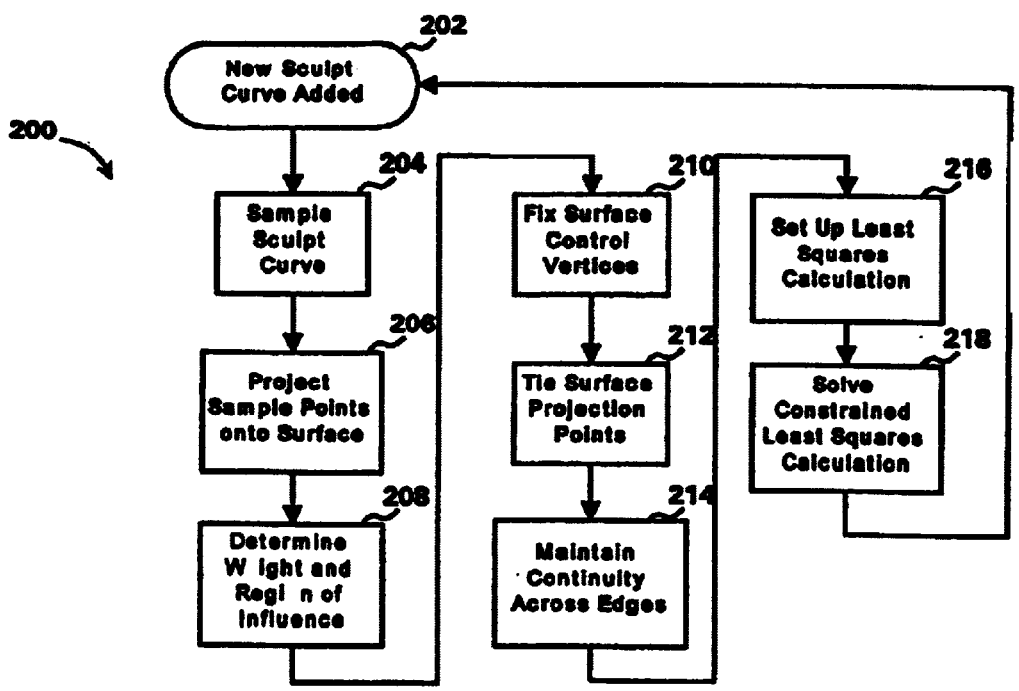
FIG. 12 is a flow chart of a method for using sculpt curves to modify the generated surfaces.

Referring to flowchart 200 of FIG. 12, each time a sculpt curve is added to a curve network (step 202), the sculpt curve is sampled at some sampling length, typically by incrementing its defining parameter (step 204). Each sculpt curve sampling point is projected towards the curve network surface(s) (206), and each projection point of a surface corresponding to the sculpt curve's sampling point is recorded. If no sampling points project onto any network surface, the sculpt curve is rejected. The particular weight and region of influence for each sampling point/projection point set are determined and recorded (step 208). Certain control vertices of the surface are then fixed (step 210), while surface projection points are tied to their corresponding sampling points along the sculpt curve (step 212). Each projection point is moved in a direction related to the shape, weight and region of influence of its corresponding sampling point. Constraints are added to the least squares minimization calculation to maintain the continuities already specified across edges of faces (step 214).

Next, a constrained least squares minimization calculation is constructed with the control vertices of the surface: those control vertices that have been fixed are constants in the calculation (the sculpt curve will not affect them); the other control vertices are, as noted, coupled to the control vertices of the sculpt curve, and form the free variables in the calculation (step 216).

The constrained least squares minimization calculation can be described as solving a system of linear equations derived from the minimization problem:

$$\text{minimize} \Sigma w_i (L_i(x)-d_i)^2$$

subject to $$H_j(x)=b_j, j=1,2,3\ldots$$

for the value of x, where x is a vector, the $w_i$ are weights, the $d_i$ and $b_j$ are constants (which can be linear combinations of constants and "symbolic" variables), and $L_i(x)$ and $H_j(x)$ are linear combinations of the components of x (step 218). A "soft constraint" refers to one of the terms $L_i(x)-d_i$ in the sum to be minimized. A "hard constraint" refers to one of the equations $H_j(x)=b_j$.

The modifications enforced on the surfaces being sculpted by the sculpt curves are specified by constraints satisfied by varying the surface control points. These constraints typically specify the position and first and second order derivatives of the surface. For example, the process of tying a point on the curve network surface to a sample point on a sculpt curve specifies a positional constraint for the surface (e.g., the surface must include a translated projection point that has been moved in the direction of the sculpt curve). Tangency between adjacent surfaces can be enforced by specifying first order derivative constraints for adjacent surfaces. Any variety of orders of derivatives can be chosen for setting further constraints on each surface.

If required, other constraints can be expressed as a linear combination of these simple constraints (position, tangency, curvature). For the NURBS curves and surfaces employed in a curve network, all of these constraints can be expressed in terms of their control points and the basis functions of the NURBS family. The result is a system of linear equations involving the control vertices, which are variables (i.e., allowed to vary) in the sculpting process, and the constraints. The system is then solved by least squares methods. Since certain constraints (the positions of the projection points) are based upon the weights assigned to the sculpt curve, the calculation can be termed "weighted least squares minimization."

The sculpting process deforms surfaces, but only as constrained by the positions and continuities of the faces as originally created. Users can interactively change these constraints to allow further sculpting, for example, by unpinning edges, by reducing continuity requirements, etc. These constraints are added to the least squares minimization calculation as constraints involving derivatives of the parametric surfaces at their edges, as before.

The constrained least squares minimization problem provides optimal positions for the control vertices of the surfaces of the curve network, based upon the shape of the sculpt curve (step 218). The solution is computed in symbolic form as a function of the control vertices of the sculpt curve, allowing simple evaluation each time the sculpt curve is edited to change the resultant network surface. This is accomplished by allowing the $d_i$'s and the $b_j$'s be linear combinations of constants and the components of the control vertices of the sculpt curve (i.e., of the symbolic variables).

Let $\{S_i\}$ be the collection of surfaces with their various control point vertices (or coefficients) considered as free variables, and let $\{S'_i\}$ be the surfaces in their initial (pre-modified-by-sculpt-curve) configuration. Let K be the sculpt curve with its control point coefficients considered as symbolic variables and let K' be the sculpt curve in its initial position.

The solution S can be expressed as a function of K, i.e., $\{S_i\}$=F(K). In other words, the components of the control points of $\{S_i\}$ are a function of the components of the control points of K. One condition the equations should satisfy is that $\{S'_i\}$=F(K'), i.e., the initial configuration of surfaces and sculpt curve must be a solution of the system. This condition prevents the surface(s) from "jumping" to a new position before the sculpt curve is modified.

The condition is assured by specifying that: (1) each soft constraint is equivalent to $L(\{S_i\},K)-L(\{S'i\},K')$, where L(A,B) is a linear combination of free (A) and symbolic (B) variables; and similarly (2) that each hard constraint is equivalent to $H(\{S_i\},K)=H(\{S'_i\},K')$, where H(A,B) is also a linear combination of free (A) and symbolic (B) variables. These constraints imply, e.g., that the coupling of the corresponding points of the sculpt curve and the projection points on the surface is effected as follows.

Let k be a point on the sculpt curve K (at parameter value t) and let s be the coupled point on the surface (at parameter values (u,v)). Let k' and s' be the initial positions of k and s at t, and (u,v). Point k is a linear combination of the control vertices of sculpt curve K, and s is a linear combination of the control vertices of surface S. Thus, a soft constraint linking the curve and the surface at this point is of the form $[(k-s)-(k'-S')]_h$, h=1, 2, 3, where $[x]_h$ is the $h^{th}$ component of the 3-dimensional expression x.

Other constraints can be added to ensure that the surface "tries" to keep its original shape unless pulled by changes in position of the sculpt curve. These soft constraints can be of the form $[S_i(u_j,v_j)-S'_i(u_j,v_j)]_h$ and are computed at several $(u_j,v_j)$ values on the surfaces. Adding a number of these soft constraints spread out uniformly across the surface(s) being modified helps to ensure that the system of equations to be solved will be non-singular.

Similar soft constraints which match various linear combinations of mixed partial derivatives of the surfaces to those of the original surfaces may be used in addition to, or in place of, purely positional soft constraints.

The methods provide a tremendous advantage in an interactive modeling system, since the process of setting up the system of equations with the required constraints (in terms of positions and derivatives) is performed only once. Every time the sculpt curve is modified (e.g., its shape is changed by translation, rotation, or alteration of control vertices) the symbolic solution can be evaluated by inserting the new positions of the sculpt curve control vertices to find the corresponding positions of the control vertices of the sculpted surfaces. Changes made to the sculpt curve then produce nearly immediate changes in the sculpted network surfaces. The only time the system of equations needs to be re-calculated is when the number of control vertices in the sculpt curves or sculpted surfaces change, or when a sculpt curve is added or removed. Steps 202 through 218 are repeated each time a sculpt curve is added to the curve network.

If the original position of the sculpt curve is very close to, or touching the surface(s) being modified, and if the coupling is made very strong, the modified surface will closely approximate the sculpt curve, giving the effect of modifying a surface by modifying a curve on the surface. The effect can be enhanced by a few additional hard connections (for example, at the initial and final points of the sculpt curve).

Using curve networks and sculpt curves, a model can be built in stages: first, the overall curves and continuity constraints of an object can be specified, and the blended surfaces automatically generated. Second, finer details can be added using sculpt curves without worrying about maintaining continuity issues. Further, network curves and sculpt curves can be added and subtracted in any order, allowing great flexibility in computer surface modeling.

Other embodiments are within the scope of the claims. For example, any type of parameterized curve can be employed to build curve networks, and as a sculpt curve. A number of different user environments can be employed to graphically display curve networks, and provide easy user manipulation and design. Once a particular object has been generated, any curves of that object, whether original network curves or generated surface (iso-parm) curves, or such curves further altered by an applied sculpt curve, can be individually selected and redefined as a new network of curves having its own generated surfaces. This allows iterative construction of models. Sculpt curves can be generalized to sculpt surfaces that can alter the shape of an underlying network surface.

What is claimed is:

1. A method of computer surface modeling comprising:
   storing in a computer memory a curve network of intersecting nonhomogenous curves; and
   automatically determining faces from the curve network, the faces having an arbitrary number of sides, wherein the faces are automatically determined by a topology estimation routine that searches coupled curve segments lying between intersections of the curves.

2. The method of claim 1 further comprising automatically determining the intersections of the curves, the intersections forming vertices.

3. The method of claim 1 further comprising automatically determining curve segments between intersections of the curves, the curve segments forming edges.

4. The method of claim 1 wherein the faces comprise closed regions formed by curve segments of the intersecting curves.

5. The method of claim 1 further comprising automatically calculating and storing in the computer memory an interpolated curved surface for a corresponding one of the faces.

6. The method of claim 1 wherein the intersecting curves comprise b-spline parameterized curves.

7. The method of claim 6 wherein the intersecting curves comprise non-uniform rational b-spline parameterized curves.

8. The method of claim 6 wherein the intersecting curves comprise non-uniform non-rational b-spline parameterized curves.

9. The method of claim 1 wherein the interpolated surface comprises a b-spline parameterized surface.

10. The method of claim 1 wherein a face can be formed from any number of coupled curve segments.

11. The method of claim 1 wherein a face can be only three-sided or four-sided.

12. The method of claim 1 wherein a face is only four-sided.

13. The method of claim 1 wherein the interpolated surface is four-sided.

14. The method of claim 1 wherein the interpolated surface is generated as four-sided and then clipped if the corresponding face is not four-sided.

15. The method of claim 1 wherein the curve network is interactively generated by a user of the computer surface modeling method.

16. The method of claim 1 wherein forming the curve network further comprises:
calculating and recording each intersection between all intersecting pairs of the plurality of intersecting curves as vertices.

17. The method of claim 1 wherein forming the curve network further comprises:
calculating and recording each curve segment along each of the plurality of curves between successive vertices as edges.

18. A method of computer surface modeling comprising:
storing in a computer memory a curve network of intersecting nonhomogeneous curves, and an interpolated surface for a face of the curve network, the face having an arbitrary number of sides; and
modifying the interpolated surface in response to manipulation of a control curve, the control curve being separate from the curves of the curve network, wherein the modifying step further comprises:
sampling the control curve at a sampling point,
coupling the sampling point to a projection point on the interpolated surface, and
controlling the shape of the interpolated surface at the projection point based upon the coupled sampling point.

19. The method of claim 18 wherein the controlling the shape step further comprises:
performing a constrained least squares minimization calculation in which the coupled projection point is a constraint, and a control vertex of the interpolated surface is a free variable.

20. A method of computer surface modeling comprising:
storing in a computer memory a curve network of intersecting nonhomogeneous curves defining faces and edges, the faces having an arbitrary number of sides;
setting a continuity constraint at an edge of a first one of the faces; and
automatically generating and storing in the computer memory an interpolated curved surface for the first face based on the set continuity constraint.

21. The method of claim 20 wherein the continuity constraint comprises positional continuity.

22. The method of claim 20 wherein the continuity constraint comprises tangential continuity.

23. The method of claim 20 wherein the continuity constraint comprises curvature continuity.

24. The method of claim 20 wherein the edge couples the first face to a second face.

25. The method of claim 24 further comprises automatically generating and storing in the computer memory an interpolated curved surface for the second subject to the set continuity constraint.

26. An interface method for use with a computer-based surface modeling program, comprising:
enabling a user to define interactively nonhomogeneous curves forming portions of a curve network associated with a surface being modeled; and
automatically in response to the defining of curves by the user, determining faces associated with the curves, the faces having an arbitrary number of sides, wherein the faces are automatically determined by a topology estimation routine that searches coupled curve segments lying between intersections of the curves.

27. An interface method for use with a computer-based surface modeling program, comprising:
enabling a user to manipulate interactively a curved control element shown on a display; and
automatically altering a surface being modeled in response to the user's manipulations of the curved control element, the surface comprising a network of intersecting curves and the control element being separate from the curves of the network, wherein faces associated with the curves are automatically determined by a topology estimation routine that searches coupled curve segments lying between intersections of the curves.

* * * * *

UNITED STATES PATENT AND TRADEMARK OFFICE
CERTIFICATE OF CORRECTION

PATENT NO.     : 6,639,592 B1
DATED          : October 28, 2003
INVENTOR(S)    : Sriram Dayanand et al.

It is certified that error appears in the above-identified patent and that said Letters Patent is hereby corrected as shown below:

Title page,
Item [54], Title, should be -- MODELING AND INTERACTIVE MANIPULATION OF COMPLEX THREE-DIMENSIONAL SURFACE MODELS USING NETWORKS OF NON-UNIFORM RATIONAL B-SPLINE CURVES AND A CONSTRAINED MINIMIZATION TECHNIQUE. --

Column 10,
Line 64, change "non-rational" to -- rational --.

Signed and Sealed this

Twenty-seventh Day of April, 2004

JON W. DUDAS
*Acting Director of the United States Patent and Trademark Office*